US008195504B2

(12) United States Patent
Merrifield, Jr. et al.

(10) Patent No.: US 8,195,504 B2
(45) Date of Patent: Jun. 5, 2012

(54) LINKING SERVICE LEVEL EXPECTATIONS TO PERFORMING ENTITIES

(75) Inventors: Eric S. Merrifield, Jr., Seattle, WA (US); Chad K. Corneil, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 927 days.

(21) Appl. No.: 12/206,589

(22) Filed: Sep. 8, 2008

(65) Prior Publication Data

US 2010/0063871 A1   Mar. 11, 2010

(51) Int. Cl.
*G06F 17/50* (2006.01)

(52) U.S. Cl. ...................................... 705/7.37
(58) Field of Classification Search .................. 705/7.37
See application file for complete search history.

(56) References Cited

U.S. PATENT DOCUMENTS

| | | | |
|---|---|---|---|
| 5,233,513 A | 8/1993 | Doyle | |
| 5,799,286 A | 8/1998 | Morgan | |
| 5,953,707 A | 9/1999 | Huang | |
| 6,151,582 A | 11/2000 | Huang | |
| 6,321,205 B1 | 11/2001 | Eder | |
| 6,345,239 B1 | 2/2002 | Bowman-Amuah | |
| 6,560,569 B1 | 5/2003 | Abu El Ata | |
| 6,601,233 B1 | 7/2003 | Underwood | |
| 6,609,120 B1 | 8/2003 | Honarvar | |
| 6,772,216 B1 | 8/2004 | Ankireddipally | |
| 6,778,971 B1 | 8/2004 | Altschuler | |
| 6,873,979 B2 | 3/2005 | Fishman | |
| 6,898,783 B1 | 5/2005 | Gupta | |
| 6,961,756 B1 | 11/2005 | Dilsaver | |
| 6,965,886 B2 | 11/2005 | Govrin | |
| 7,043,454 B2 | 5/2006 | Powell | |
| 7,120,896 B2 | 10/2006 | Budhiraja | |
| 7,162,427 B1 | 1/2007 | Myrick et al. | |
| 7,243,120 B2 | 7/2007 | Massey | |
| 7,246,144 B2 | 7/2007 | Walsh | |
| 7,251,613 B2 | 7/2007 | Flores | |
| 7,281,235 B2 | 10/2007 | Datta et al. | |
| 7,308,414 B2 | 12/2007 | Parker | |
| 7,308,417 B1 | 12/2007 | Nathan | |
| 7,461,038 B2 | 12/2008 | Kropaczek et al. | |
| 7,506,302 B2 | 3/2009 | Bahrami | |
| 7,580,913 B2 | 8/2009 | Chandra et al. | |

(Continued)

FOREIGN PATENT DOCUMENTS

WO    00/42553    7/2000

(Continued)

OTHER PUBLICATIONS

Wilmot, "Foreign Keys Decrease Adaptability of Database Designs," Comm. ACM, Dec. 1984, vol. 27, No. 12, pp. 1237-1243.

(Continued)

*Primary Examiner* — Susanna M Meinecke Diaz
(74) *Attorney, Agent, or Firm* — Workman Nydegger

(57) ABSTRACT

The present invention extends to methods, systems, and computer program products for linking service level expectations to performing entities. Embodiments of the invention facilitate an express, measured relationship between each entity and the performance of a corresponding business capability. Thus, when an entity or layer changes, the impact to the performance can be asserted, and later validated through the specific measures. Schematized links for entities and/or business layers can be used to connect to a service level expectation schema to appropriately define how entities and/or business layers contribute to the performance of a business capability.

20 Claims, 11 Drawing Sheets

U.S. PATENT DOCUMENTS

| | | | |
|---|---|---|---|
| 7,703,071 | B2 | 4/2010 | Kuester |
| 2001/0053991 | A1 | 12/2001 | Bonabeau |
| 2002/0013720 | A1 | 1/2002 | Ozono |
| 2002/0049573 | A1 | 4/2002 | El Ata |
| 2002/0059264 | A1 | 5/2002 | Fleming |
| 2002/0095393 | A1 | 7/2002 | McHaney |
| 2002/0103869 | A1 | 8/2002 | Goatly |
| 2002/0133368 | A1* | 9/2002 | Strutt et al. .................. 705/1 |
| 2002/0138484 | A1 | 9/2002 | Bialek et al. |
| 2002/0186238 | A1 | 12/2002 | Sylor |
| 2002/0198722 | A1 | 12/2002 | Yuschik |
| 2002/0198727 | A1 | 12/2002 | Ann |
| 2002/0198800 | A1 | 12/2002 | Shamrakov |
| 2003/0033182 | A1 | 2/2003 | Stok |
| 2003/0046123 | A1 | 3/2003 | Chen |
| 2003/0065690 | A1 | 4/2003 | Kelley |
| 2003/0084053 | A1 | 5/2003 | Govrin |
| 2003/0216955 | A1 | 11/2003 | Miller |
| 2004/0034496 | A1 | 2/2004 | Correll |
| 2004/0034615 | A1 | 2/2004 | Thompson |
| 2004/0054690 | A1 | 3/2004 | Hillerbrand |
| 2004/0068431 | A1 | 4/2004 | Smith |
| 2004/0138933 | A1 | 7/2004 | LaComb |
| 2004/0143470 | A1 | 7/2004 | Myrick |
| 2004/0153436 | A1 | 8/2004 | Pope |
| 2004/0172319 | A1 | 9/2004 | Eder |
| 2004/0177326 | A1 | 9/2004 | Bibko |
| 2004/0181538 | A1 | 9/2004 | Lo |
| 2004/0230404 | A1 | 11/2004 | Messmer |
| 2004/0236618 | A1 | 11/2004 | Smith |
| 2004/0243595 | A1 | 12/2004 | Cui |
| 2005/0021348 | A1 | 1/2005 | Chan et al. |
| 2005/0021433 | A1 | 1/2005 | Hyler |
| 2005/0027752 | A1 | 2/2005 | Gelbard |
| 2005/0033716 | A1 | 2/2005 | Ambroz |
| 2005/0043977 | A1 | 2/2005 | Ahern |
| 2005/0049882 | A1 | 3/2005 | Sawka |
| 2005/0065805 | A1 | 3/2005 | Moharram |
| 2005/0071737 | A1 | 3/2005 | Adendorff |
| 2005/0075914 | A1 | 4/2005 | Bayne |
| 2005/0086189 | A1 | 4/2005 | Noble |
| 2005/0091093 | A1 | 4/2005 | Bhaskaran |
| 2005/0108022 | A1 | 5/2005 | Bhattacharya et al. |
| 2005/0149558 | A1 | 7/2005 | Zhuk |
| 2005/0197969 | A1 | 9/2005 | McElroy |
| 2005/0216320 | A1 | 9/2005 | Hattaway |
| 2005/0222893 | A1 | 10/2005 | Kasravi |
| 2006/0005157 | A1 | 1/2006 | Saxena |
| 2006/0064335 | A1 | 3/2006 | Goldszmidt et al. |
| 2006/0074833 | A1 | 4/2006 | Gardner |
| 2006/0111921 | A1 | 5/2006 | Chang |
| 2006/0116919 | A1 | 6/2006 | Homann |
| 2006/0116922 | A1* | 6/2006 | Homann et al. ............. 705/10 |
| 2006/0149764 | A1 | 7/2006 | Burchfield |
| 2006/0167665 | A1* | 7/2006 | Ata ................................ 703/2 |
| 2006/0167704 | A1 | 7/2006 | Nicholls et al. |
| 2006/0178928 | A1 | 8/2006 | Carney |
| 2006/0206374 | A1 | 9/2006 | Asthana et al. |
| 2006/0224425 | A1 | 10/2006 | Homann |
| 2006/0229922 | A1 | 10/2006 | Levy |
| 2006/0229926 | A1 | 10/2006 | Homann |
| 2006/0235732 | A1 | 10/2006 | Miller et al. |
| 2006/0241954 | A1 | 10/2006 | Jeng |
| 2006/0241956 | A1 | 10/2006 | Levy |
| 2006/0242176 | A1 | 10/2006 | Tsyganskiy |
| 2006/0247943 | A1 | 11/2006 | Kapoor |
| 2006/0277156 | A1 | 12/2006 | Merican |
| 2006/0293911 | A1 | 12/2006 | Wittmann |
| 2007/0016886 | A1 | 1/2007 | O'Neil |
| 2007/0021992 | A1 | 1/2007 | Konakalla |
| 2007/0022404 | A1 | 1/2007 | Zhang |
| 2007/0043724 | A1 | 2/2007 | Senan |
| 2007/0067195 | A1 | 3/2007 | Fahner |
| 2007/0078702 | A1 | 4/2007 | Tandon |
| 2007/0094288 | A1 | 4/2007 | Enenkiel |
| 2007/0124184 | A1 | 5/2007 | Schmit |
| 2007/0143174 | A1 | 6/2007 | Tien |
| 2007/0162496 | A1 | 7/2007 | Pulfer |
| 2007/0174109 | A1 | 7/2007 | Cohn |
| 2007/0174840 | A1 | 7/2007 | Sharma |
| 2007/0203589 | A1 | 8/2007 | Flinn |
| 2007/0203718 | A1* | 8/2007 | Merrifield .................... 705/1 |
| 2007/0203766 | A1* | 8/2007 | Adler et al. .................. 705/7 |
| 2007/0226163 | A1 | 9/2007 | Robles |
| 2007/0234277 | A1 | 10/2007 | Lei |
| 2007/0250361 | A1 | 10/2007 | Hazy |
| 2008/0120573 | A1 | 5/2008 | Gilbert |
| 2008/0270448 | A1 | 10/2008 | Brennan et al. |
| 2009/0112655 | A1 | 4/2009 | Stuhec |
| 2009/0158237 | A1* | 6/2009 | Zhang et al. .............. 717/100 |

FOREIGN PATENT DOCUMENTS

| | | |
|---|---|---|
| WO | WO016352 A2 | 1/2001 |

OTHER PUBLICATIONS

Mathiassen, "Business Agility and Diffusion of Information Technology," 2006, European Journal of Information Systems, vol. 15, pp. 116-119.

Plachy, "Enterprise Solutions Structure," 1999, IBM Systems Journal, vol. 38, No. 1, pp. 4-10.

Noble, "Agile Application-Aware Adaptation for Mobility," Oct. 1997, Proc. 16th ACM Symposium, Op. Sys. Principles.

U.S. Appl. No. 12/242,430, mail date May 9, 2011, Office Action.

U.S. Appl. No. 12/187,257, mail date May 19, 2011, Office Action.

Sehmi, Arvindra, et al., "Service Oriented Modeling for Connected Systems", Architecture Journal, 2006, Journal 7, 26 pages.

Malhotra, Yogesh, "Integrating knowledge management technologies in organizational business processes: getting real time enterprises to deliver real business performance", vol. 9 No. 1, 2005, pp. 7-28, Emerald Group Publishing Limited, Journal of Knowledge Management.

Garnder, Jay M., "Building Business Value Faster with Managed Services", 2005 BMC Software, Inc., 8 pages.

Office Action dated May 28, 2009 cited in U.S. Appl. No. 11/094,926.

Office Action dated Jun. 25, 2009 cited in U.S. Appl. No. 11/112,777.

Office Action dated Sep. 17, 2009 cited in U.S. Appl. No. 11/230,206.

Office Action dated Oct. 2, 2009 cited in U.S. Appl. No. 11/094,988.

U.S. Appl. No. 11/361,199, mail date Oct. 12, 2010, Office Action.

U.S. Appl. No. 12/323,086, Mail Date Jul. 5, 2011, Office Action.

Office Action dated Nov. 18, 2009 cited in U.S. Appl. No. 10/999,852.

Office Action dated Nov. 17, 2009 cited in U.S. Appl. No. 11/076,142.

Office Action dated Jan. 13, 2010 cited in U.S. Appl. No. 11/361,199.

Office Action dated Feb. 3, 2009 cited in U.S. Appl. No. 11/230,206.

Office Action dated Mar. 5, 2009 cited in U.S. Appl. No. 11/076,142.

Office Action dated Mar. 5, 2009 cited in U.S. Appl. No. 10/999,852.

U.S. Appl. No. 12/202,920, filed Sep. 2, 2008, Merrifield.

U.S. Appl. No. 12/187,257, filed Aug. 6, 2008, Merrifield.

U.S. Appl. No. 12/242,430, filed Sep. 30, 2008, Merrifield.

U.S. Appl. No. 12/323,086, filed Nov. 25, 2008, Merrifield.

U.S. Appl. No. 12/242,412, filed Sep. 30, 2008, Merrifield.

IBM, "Orchestrating Brilliance Managing Innovation in an On-Demand World", Based on Information and belief available, at least as early as Nov. 2, 2007, 3 Pages.

Matheson, Lona, "Identifying the Strategic Opportunities of E-Business Innovation", Aug. 2006, 3 Pages.

Business Victoria—Managing & Improving Your Business—Innovation, Based on Information and belief available, at least as early as Nov. 2, 2007, 3 Pages.

IBM, "Impacting Business Agility with SOA: Highlights of IBM's Recent Announcements", IBM Impact 2007, 4 Pages.

Taylor, James, "Is Business Agility an Oxymoron?" Oct. 4, 2004, 2 Pages.

Computacenter Services, "Outsourcing Enhances Business Agility", 2007, 2 Pages.

Palmer, Mark, "Event Stream Processing & Business Agility", Feb. 16, 2006, 4 Pages.

InfoSys Technologies Limited, "Enterprise Performance Management Solution", 2007, 1 Page.

Navigation Views, "Key Performance Indicators View", Based on Information and Belief Available, at least as early as Nov. 20, 2007, 1 page.

Medicke, John, et al., "Manage Business Performance, Part 2: Retail Scenarios and Business Performance Management Architecture", Jun. 1, 2004, 9 Pages.

Ing. M.G. (Rine) le Comte BSc., "Business Processes and Workflow Management in an Enterprise Resource Planning Content", OOPSLA 1997, Atlanta, Business Object Workshop III, 5 Pages.

Nayak, N., et al., IBM Systems Journal, "Core Business Architecture for a Service-Oriented Enterprise", Accepted for Publication Jun. 12, 2007; Published Online Sep. 27, 2007, 17 Pages.

Deloitte, "Service-Enabled Enterprise Resource Planning: Challenging the Boundaries of Traditional Packaged Application to Deliver Business Value", 2006, 11 Pages.

Franke, Jochen, et al., "Bridging the Gap: Linking IT-Infrastructure and Business Processes", 2004, 8 Pages.

Homann, Ulrich, "A Business-Oriented Foundation for Service Orientation", Feb. 2006, 9 Pages.

Merrifield, Ric and Tobey, Jon; "Motion Lite: A rapid Application of the Business Architecture Techniques Used by Microsoft Motion", May 2006, 20 Pages.

Starta Development Inc. "The Tools You Need: Business Innovations" Printed from http://www.startadevelopment.com/r.sh?content—BusinessInnovations on Nov. 7, 2007; 5 Pages.

Nagumo, Toshida; "Innovative Business Models in the Era of Ubiquitous Networks" NPL Papers No. 49, Jun. 1, 2002, Copyright 2002 by Nomura Research Institute, Ltd.

Li, Hua Huang and Yu, Yang Cai; "Organization and Management Innovation", (Dept. of Information Management and Information Systems, Research Center of E-Business, School of Management, Fudan University, Shanghai 200433) Printed Nov. 7, 2007.

Kotelnikov, Vadim; "Business Innovation: Reinventing Your Business and Competitive Rules" Printed from http://www.1000ventures.com/business_guide/innovation_business.html, Printed Nov. 7, 2007.

Office Action dated Nov. 10, 2008 cited in U.S. Appl. No. 11/094,926.

Office Action dated Oct. 25, 2011 cited in U.S. Appl. No. 12/323,086.

Notice of Allowance dated in Dec. 1, 2011 cited in U.S. Appl. No. 12/242,430.

Office Action dated Sep. 1, 2011 cited in U.S. Appl. No. 12/202,920.

Office Action dated Sep. 6, 2011 cited in U.S. Appl. No. 12/242,412.

Notice of Allowance dated in Sep. 7, 2011 cited in U.S. Appl. No. 12/242,430.

Office Action dated Sep. 9, 2011 cited in U.S. Appl. No. 12/187,257.

Office Action dated Oct. 12, 2011 cited in U.S. Appl. No. 11/361,199.

* cited by examiner

LINKING SERVICE LEVEL EXPECTATIONS TO PERFORMING ENTITIES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many business related processes are distributed across a number of different computer systems and/or a number of different computing components.

The ability of an organization to understand the underlying entities in their processes is important to staying competitive in a given field. The need for this understanding is often useful to identify under performing or over performing business units, new competing products, regulatory changes, etc. However, in many organizations, there is no expressly defined link between what part of a business does and how they do it. For example, an airline may know that it has the capability to "check-in" passengers, but may not be able to fully understand how existing information technology, personnel, and processes contribute to the check-in process. Thus, it can be difficult for a business (or other businesses) to understand its capabilities and how they operate. For example, it may be difficult for an airline (or a prospective buyer of the airline) to realize that small improvements in information technology could make check-in significantly more efficient.

Without a common definition for linking what a business does to how they do it, it is also difficult to formulate computer based tools and methods to assist in improving the entities that contribute to a business capability. Thus, organizations can have further difficulties in improving performance based on existing business models. For example, it can be difficult for an organization to isolate entities based on their performance impact and determine how capabilities can benefit from changes in functionality (e.g., more or less man power, new software applications, more efficient processes, etc).

BRIEF SUMMARY

The present invention extends to methods, systems, and computer program products for linking service level expectations to performing entities. Embodiments of the invention include determining what impact a change in an entity's performance has on a business capability's performance. A computer architecture accesses a business capability from the schema-based model for the organization. The business capability models a portion of what work the organization does. The business capability also includes a service level expectation property indicating metrics for measuring the business capabilities performance.

The computer architecture identifies an express schema-based link between the business capability and each of one or more sets of entities. Each set of entities includes one or more entities that interoperate to perform a representative portion of the work for the business capability. Each schema based-link includes property values indicating the contribution of the corresponding set of entities to the service level expectation metrics for the business capability. Property values for each schema-based link are determined from the performance of the one or more entities included in the corresponding set of entities.

A set of entities is selected, from among the one or more sets of entities that represent how a portion of the work for the business capability is performed. For the selected set of entities, at least one designated entity within the set or entities is isolated. A change in the performance of the at least one designated entity is simulated. Property values are determined for the selected set of entities associated with the schema-based link. The property values are determined from the performance of the one or more entities based on the simulated change in performance of the at least one designated entity.

Service level expectation metrics are calculated for the business capability based on property values from express schema-based links for each of the sets of entities that contribute to performance of the business capability, including the selected set of entities. The calculated service level expectation metrics are compared to existing service level expectation metrics to determine the impact that the simulated change in the performance of the at least one designated entity has on the performance of the business capability.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
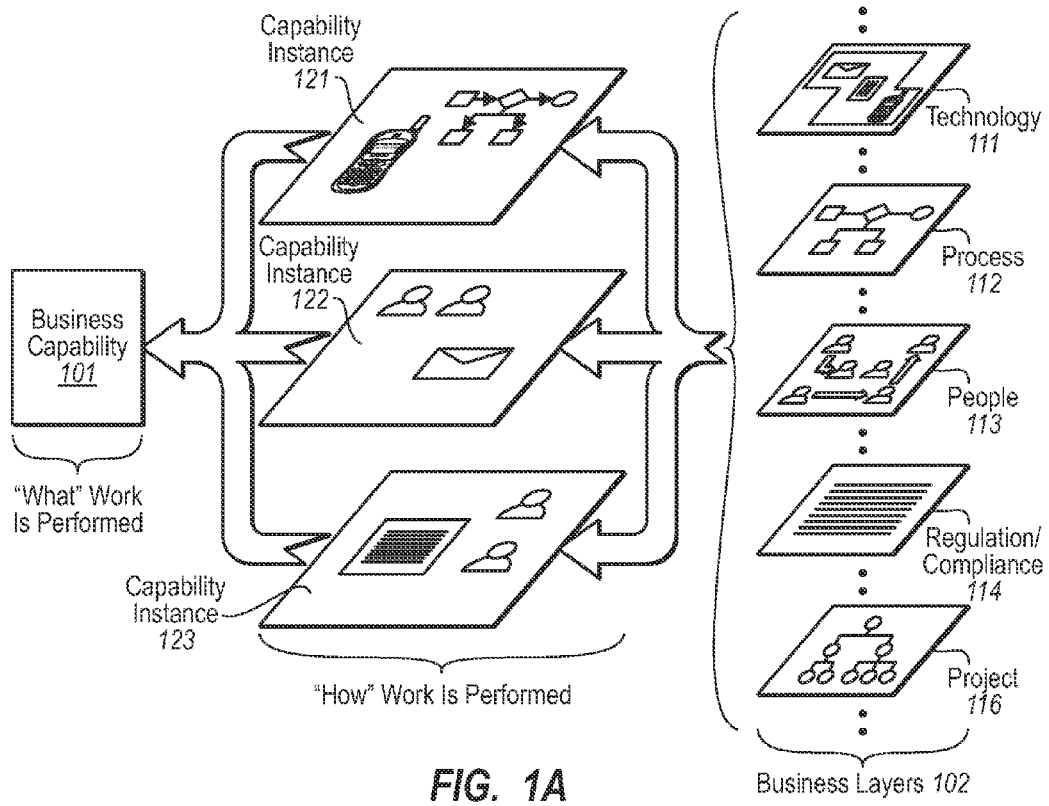
FIG. 1A illustrates an example computer architecture of a business capability and entities that contribute to performance of the business capability.

The present invention extends to methods, systems, and computer program products for linking service level expectations to performing entities. Embodiments of the invention include determining what impact a change in an entity's performance has on a business capability's performance. A computer architecture accesses a business capability from the schema-based model for the organization. The business capability models a portion of what work the organization does. The business capability also includes a service level expectation property indicating metrics for measuring the business capabilities performance.

The computer architecture identifies an express schema-based link between the business capability and each of one or more sets of entities. Each set of entities includes one or more entities that interoperate to perform a representative portion of the work for the business capability. Each schema based-link includes property values indicating the contribution of the corresponding set of entities to the service level expectation metrics for the business capability. Property values for each schema-based link are determined from the performance of the one or more entities included in the corresponding set of entities.

A set of entities is selected, from among the one or more sets of entities that represent how a portion of the work for the business capability is performed. For the selected set of entities, at least one designated entity within the set or entities is isolated. A change in the performance of the at least one designated entity is simulated. Property values are determined for the selected set of entities associated with the schema-based link. The property values are determined from the performance of the one or more entities based on the simulated change in performance of the at least one designated entity.

Service level expectation metrics are calculated for the business capability based on property values from express schema-based links for each of the sets of entities that contribute to performance of the business capability, including the selected set of entities. The calculated service level expectation metrics are compared to existing service level expectation metrics to determine the impact that the simulated change in the performance of the at least one designated entity has on the performance of the business capability.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, it should be understood, that upon reaching various computer system components, program code means in the form of computer-executable instructions or data structures can be transferred automatically from transmission media to physical storage media (or vice versa). For example, computer-executable instructions or data structures received over a network or data link can be buffered in RAM within a network interface module (e.g., a "NIC"), and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the can include a variety of components that are connected to one another over (or be part of) a network, such as, for example, a Local Area Network ("LAN"), a Wide Area Network ("WAN"), and even the Internet. Accordingly, each of the depicted components as well as any other connected components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, a business capability indicates "what" work is performed, such as, for example, "Purchase Goods". Entities that contribute to the performance of a capability indicate "how" work is performed, such as, for example, an employee uses an software application to generate a request for proposal ("RFP") and sends the RFP to prospective sellers, a Web service receives bids from prospective sellers, employees and automated analysis tools interact to evaluate received bids and identify a small subset of the best bids, a management committee then conducts a review process over small subset, a final selected bid is approved by the CEO, the final selected bid is then forwarded to purchasing, purchasing uses a Web service to purchase goods from the winning organization.

Thus, entities that indicate how work is performed can be distributed across a number of different layers within an organization. Generally, a business capability indicates "what" work is performed and entities within various business layers indicate "how" work is performed. Entities can be spread across a variety of different business layers including a technology layer, a process layer, a people layer, a compliance/regulation layer, a project layer, other organization and/or industry defined layers, etc. Entities from different layers can blend together in different ways to formulate a variety of different representations of "how" work is performed.

Multiple different implementations of "how" work is performed can each contribute to "what" work is performed. For example, for an airline, a first combination of entities from various business layers can be blended together to represent online check in, a second different combination of entities from various business layers can be blended kiosk check in, and a third different combination of entities from various business layers can be blended counter check in, for airline flights. Each of online check in, kiosk check in, and counter check in can contribute to a business capability for checking in passengers.

FIG. 1A illustrates an example computer architecture of a business capability 101 and entities that contribute to performance of business capability 101. Business capability 101 indicates "what" work is performed. Business layers 102 includes a number different (and a non-exhaustive list of) business layers, including technology layer 111, process layer 112, people layer 113, compliance/regulatory layer 114, and project layer 116. Each layer includes one or entities that can be blended together with other entities from the same and/or different layers to formulated a capability instance that indicates "how" work is performed. For example, entities in technology layer 111 can include internal and external computer systems, applications, networks, etc., entities in process layer 112 can include internal and external workflows, organization charts, etc., entities in people layer 113 can include employees, managers, officers, contractors, customers, auditors, etc., entities in regulatory/compliance layer 1114 can include government regulations and rules, industry regulations and rules, organizations regulations and rules, etc., entities in project layer 116 can include directives, strategies, etc.

Generally, capability instances 121, 122, and 123 indicate "how" work is performed for business capability 101. Each of capability instances 121, 122, and 123 can blend together zero or more entities from each of the layers in business layers 101 to form an implementation of business capability 101. For example, referring back to the airline example, business capability 101 can be checking in passengers. In this example, capability instance 121 can be online check in, capability instance 122 can be kiosk check in, and capability instance 123 can be counter check in.

Figure 1B:
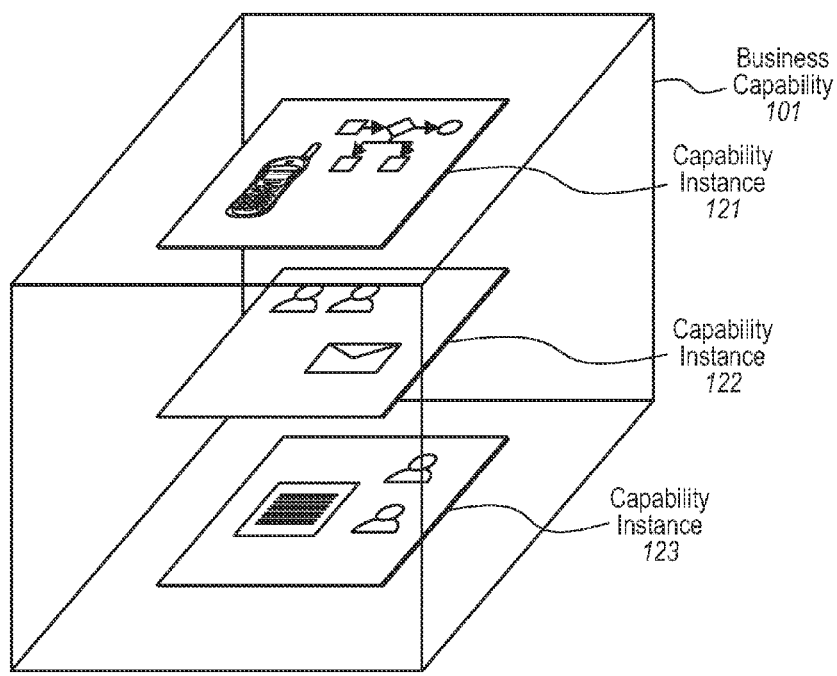
FIG. 1B illustrates an example computer architecture of another view of the business capability and entities that contribute to performance of the business capability.

FIG. 1B illustrates an example computer architecture of business capability 101 and capability instances that contribute to performance of business capability 101. FIG. 1B is a three-dimensional view with, capability instances 121, 122, and 123 contained inside. As depicted, each of capability instances 121, 122, and 123 includes a different blend of entities from business layers 102.

n some embodiments, business models and data format definitions for business capabilities are generally described as indicated in Table 1.

TABLE 1

| | |
|---|---|
| Models | Models serve to group capabilities into distinct groups that describe a single business. Models can contain all the capabilities defined for the business as well as how any defined capabilities relate to each other in terms of hierarchical decomposition and process flow relationships. Models facilitate the segmentation of data in a repository into distinct business models which can be compared with one another but are separate from each other. Further, while capability data is defined within a model, other data elements of the data model are outside of the model and facilitate the comparison of different models with one another. |
| Capabilities | Capabilities are individual business functional areas that are modeled in at least three different ways in the model. Capabilities can be modeled as individual things with their own set of properties; as a decomposition hierarchy of functional areas; and as connected in simple business process flows. Coarser (or higher level) capabilities can include a set of more granular (or lower level) capabilities, such as, for example, when a higher level capability is decomposed into its constituent parts. The assignment of properties to capabilities may occur at multiple levels in a hierarchy, which can be used to control later data transformations. For example, when a higher level capability is manipulated through a transformation, corresponding lower level capabilities' properties can be considered in the transformation |
| Capability Inputs and Outputs | Capability Inputs and Outputs are the artifacts and events that are consumed and/or produced by business capabilities. They represent what is outward and visible about the behavior of the capabilities. Inputs can be consumed and outputs can be produced independently of other inputs and outputs. For example, there is no requirement that all the inputs for a capability be consumed before the capability starts. Likewise, there is no requirement that all the processing of a capability be completed before an output can be produced. |
| Processes | Processes are networks of business capabilities that are connected in a flow to illustrate and end-to-end view of a business process. Processes define the connections between capabilities that enable larger business functions. |

TABLE 1-continued

| | |
|---|---|
| | Processes modeled in the data model can refer to cross-capability processes that represent traversal of boundaries between capabilities. Further, each implementation of a capability is also a network of processes. For example, a capability can be part of a process. The part of the process can include further, limited scope, capabilities. Accordingly, process and capability can be view as decomposing at essentially the same rate. |
| Connections | Connections are used to represent relationships between business capabilities. Connections can be data connections over which data, such as, for example, a business document, can flow between those capabilities. However, other types of connections are also possible. Connections may also refer to oversight or management of a business function, as frequently occurs in regulated areas of business activity. Connections can be typed such that connection types are the same across all models. Typed connections can be used to facilitate model comparisons. |
| Service Levels | Service levels refer to the general expectation of the performance of a capability. Service levels attach performance and accountability attributes to a capability in varying degrees of formality (e.g., contractual) and time (e.g., historical, current, target, and maximum). In some embodiments, a capability includes a verb and noun phrase (or such a verb-noun phrase can be construed from the capability description). Service level descriptive data associated with the capability indicates how well the capability performs the action implied by the phrase. For example, Approve Loan Application might have a service level expectation of 2 days. |

Figure 2:
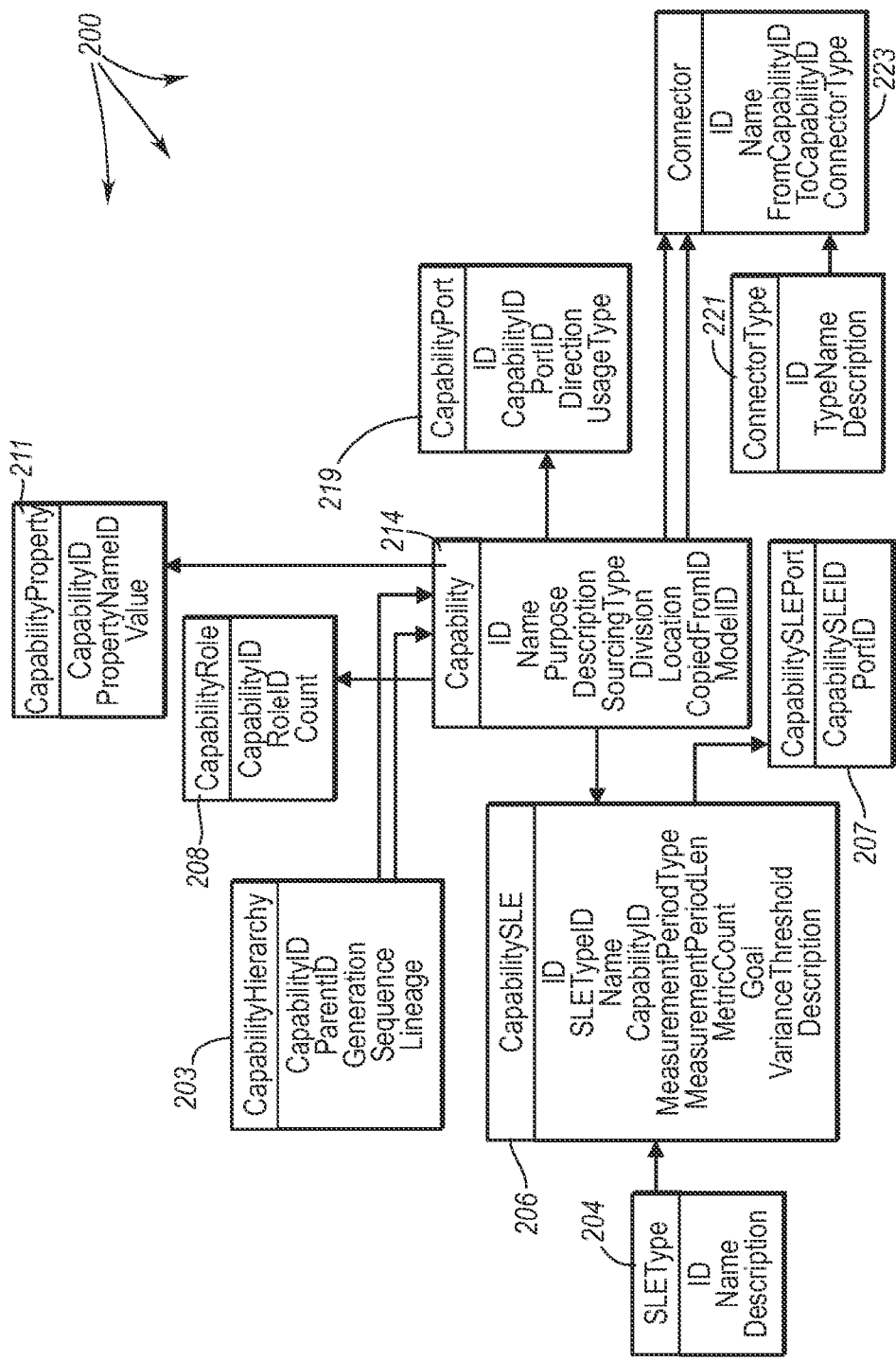
FIG. 2 illustrates a portion of an example capability modeling schema that can be used for efficiently and flexibly business modeling based upon structured business capabilities.

FIG. 2 illustrates a portion of an example capability modeling schema that can be used for efficiently and flexibly business modeling based upon structured business capabilities. Capability modeling schema 200 can include data formats for modeling business capability properties, business capability inputs and outputs, business capability processes, business capability connections, and business capability service level expectations. It should be understood that business capability modeling schema 200 can be one of a plurality of schemas that includes data definitions for modeling a corresponding portions of an organization.

Depicted in FIG. 2, schema 200 includes capability data format 214. Generally, capability data format 214 can be described as indicated in Table 2.

TABLE 2

| Name | Data Type | Description |
|---|---|---|
| ID | int | Key to the capability and is used to relate other data entities to this capability. |
| Name | varchar(256) | Name that is unique within a particular model. |
| Purpose | varchar(1000) | Short description of the capability. |
| Description | varchar(8000) | A more detailed description of the capability and may explain relationships and properties of this capability as well as the capability itself. |
| SourcingType | int | This field can have three values: Internal, Outsourced, or Both. It indicates whether or not the capability is performed by an organization that is internal (part of) the organization that "owns" the model; or an organization that is a supplier of the capability to the "owner" of the model; or it is performed by both internal and external suppliers. |
| Division | varchar(100) | Identifies the business organizational area where a capability is performed. |
| Location | varchar(100) | Geographical location where the capability is performed. |

TABLE 2-continued

| Name | Data Type | Description |
|---|---|---|
| CopiedFromID | int | Indicates the specific capability (and hence template model) from which this capability was copied. Can be a system-set value. |
| ModelID | int | Indicates the model to which this capability belongs. |

Depicted in FIG. 2, schema 200 includes capability hierarchy data format 203. Generally, capability hierarchy data format 203 can be described as indicated in Table 3.

TABLE 3

| Name | Data Type | Description |
|---|---|---|
| CapabilityID | int | Links to a capability. |
| ParentID | int | Links to a capability in the same model and indicates the parent of this capability in a hierarchical view of the model's capabilities. |
| Generation | int | Part of the lineage key which is used in certain queries. |
| Sequence | int | Part of the lineage key which is used in certain queries. |
| Lineage | varchar(20) | Indicates the entire ancestral lineage of a capability and used to perform hierarchical sorts. |

Depicted in FIG. 2, schema 200 includes capability property data format 211. Generally, capability property data format 211 can be described as indicated in Table 4.

TABLE 4

| Name | Data Type | Description |
|---|---|---|
| CapabilityID | int | Links to a capability. |
| PropertyNameID | int | Links to a user-defined property. |
| Value | varchar(250) | Value of the property for this capability. |

Depicted in FIG. 2, schema 200 includes capability port data format 219. Generally, capability port data format 219 can be described as indicated in Table 5.

TABLE 5

| Name | Data Type | Description |
|---|---|---|
| ID | int | Key to the capability port and is used to relate this port to other entities. |
| CapabilityID | int | Links to the capability that is referenced by this relationship. |
| PortID | int | Links to the port that is referenced by this relationship. |
| Direction | int | Has three values and indicates whether or not the item is input into the referenced capability, output from the referenced capability, or it flows both directions. |
| UsageType | int | Links to the UsageType entity and indicates how the capability uses this item. Examples are "Read only", "Read and update", "Create", etc. |

Depicted in FIG. 2, schema 200 includes capability role data format 308. Generally, capability role data format 208 can be described as indicated in Table 6.

TABLE 6

| Name | Data Type | Description |
| --- | --- | --- |
| CapabilityID | int | References a specific capability and serves to link that capability with a specific role. |
| RoleID | int | References a specific role and links it to the referenced capability. |
| Count | int | Indicates the number of people in this role that are required to perform this capability. A value of '0' indicates that the role participation has not been quantified. |

Depicted in FIG. 2, schema 200 includes SLE type data format 204. Generally, SLE type data format 204 can be described as indicated in Table 7.

TABLE 7

| Name | Data Type | Description |
| --- | --- | --- |
| ID | int | Key to the SLEType entity and is used to relate this role to CapabilitySLE entities. |
| Name | varchar(100) | Uniquely names the type of service level that is described in this entity. This entity is assumed to be read-only by modelers because the modeling tools rely on the value of these entries to visualize service levels. Some values for service level types include "Duration", "Throughput", "Monetary Cost", "Time Cost" and "Concurrency". |

TABLE 7-continued

| Name | Data Type | Description |
| --- | --- | --- |
| Description | varchar(4000) | A detailed description of the service level type and how to describe specific service levels related to capabilities. |

Depicted in FIG. 2, schema 200 includes Capability SLE data format 206. Generally, Capability SLE data format 206 can be described as indicated in Table 8.

TABLE 8

| Name | Data Type | Description |
| --- | --- | --- |
| ID | int | Key to the Role entity and is used to relate this role to Capability entities. |
| SLETypeID | int | References the SLEType entity and identifies a specific way to measure a service level. |
| Name | varchar(50) | A unique name for the service level definition. |
| CapabilityID | int | References the capability to which this service level applies. |
| MeasurementPeriodType | varchar(50) | Names the unit of measure for the service level. For "Duration" type service levels, this should be a time period. For a "Monetary Cost" SLE type, "Dollars" or "Thousands of dollars" would be appropriate. |
| MeasurementPeriodLen | int | If the SLE type references a "Throughput" type of SLE, this field indicates the length of the measurement period for throughput. |
| MetricCount | int | An actual (current status/performance or historical performance) measurement of the SLE, such as the number of days of duration, the number of items completed for throughput, the amount of dollars for monetary cost, etc. |
| Goal | int | A target for future performance such as the number of days of duration, the number of items completed for throughput, the amount of dollars for monetary cost, etc. |
| VarianceThreshold | int | How much variation in performance (e.g., from a goal) is tolerated before a variation is noted or notification is sent. For example, when a variance threshold is exceeded an electronic mail message can be sent to appropriate management personnel |
| Description | varchar(2000) | A detailed description of the SLE for this capability. |

Depicted in FIG. 2, schema 200 includes Capability SLE Port data format 207. Generally, Capability SLE port data format 207 can be described as indicated in Table 9.

TABLE 9

| CapabilitySLEID | int | References a particular service level for a specific capability as described in a CapabilitySLE entity. It serves to link a particular service level to a particular input or output item. |
| --- | --- | --- |
| PortID | int | References a particular input or output item of a capability and links a service level to the specific item that is being measured. For example, this might reference mortgage approvals for a duration service level for a mortgage processing capability and the entire service level definition might thereby |

TABLE 9-continued describe that 100 mortgage approvals are completed every day for the mortgage processing capability.

Depicted in FIG. 2, schema 200 includes connector type data format 221. Generally, connecter type data format 221 can be described as indicated in Table 10.

TABLE 10

| Name | Data Type | Description |
| --- | --- | --- |
| ID | int | Key to the ConnectorType entity and is used to describe the connection type in the Connector entity. |
| TypeName | varchar(50) | A unique name that describes the type of connection. Examples are "Collaborative", "Controlling", "Dependent", etc. |
| Description | varchar(4000) | A detailed description of the connection type and helps modelers understand what connections mean in their models. |

Depicted in FIG. 2, schema 200 includes connector data format 223. Generally, connecter data format 223 can be described as indicated in Table 11.

TABLE 11

| Name | Data Type | Description |
| --- | --- | --- |
| ID | int | Key to the Connector entity and indicates the connection between two capabilities. This key is used to link this connection to other entities. |
| Name | varchar(256) | A comment that is associated with this connection between two capabilities. |
| FromCapabilityID | int | References the capability that is the source capability. Depending on the ConnectorType, the meaning of being the source capability may differ slightly. |
| ToCapabilityID | int | References the capability that is the target capability. Depending on the ConnectorType, the meaning of being the target capability may differ slightly. |
| ConnectorType | int | Link to the ConnectorType entity and indicates what the relationship between the two referenced capabilities really means. Examples are "Collaborative", "Controlling", "Dependent", etc. |

It should be understood that schema 200 is merely one example of a business capability modeling schema. It would be apparent to one skilled in the art, after having reviewed this description, that embodiments of the present invention can be used with a wide variety of other business capability modeling schemas, in addition to schema 200. Further, modeling business capabilities does not require that capability attributes for all the data formats in schema 200 be accessible. For example, a capability and connecter can be used to model a business capability based on capability data format 214 and connector data format 223, without accessing capability attributes corresponding to other data formats. Thus, schema 200 defines data formats for business capability attributes that are accessed, but does not require that all data formats be populated to generate a business capability model.

Accordingly, in some embodiments, the business capabilities for an organization are included together in a collection of business capabilities modeled in accordance with a schema. A collection of business capabilities can be represented as a (e.g., structured or schematized) business capability model. An organization can formulate business capability attributes representing current performance of their collection of business capabilities. A modeling application (not shown) can receive the business capability attributes (e.g., from a business capability business layer) and model the business capability attributes into a business capability model. A business capability model can be represented in a variety of different ways depicting various levels of detail (e.g., up to the level of detail of the business capability attributes). A business capability model can be configured visually for output at a user-interface and/or can be retained as data for further processing.

Figure 3A:
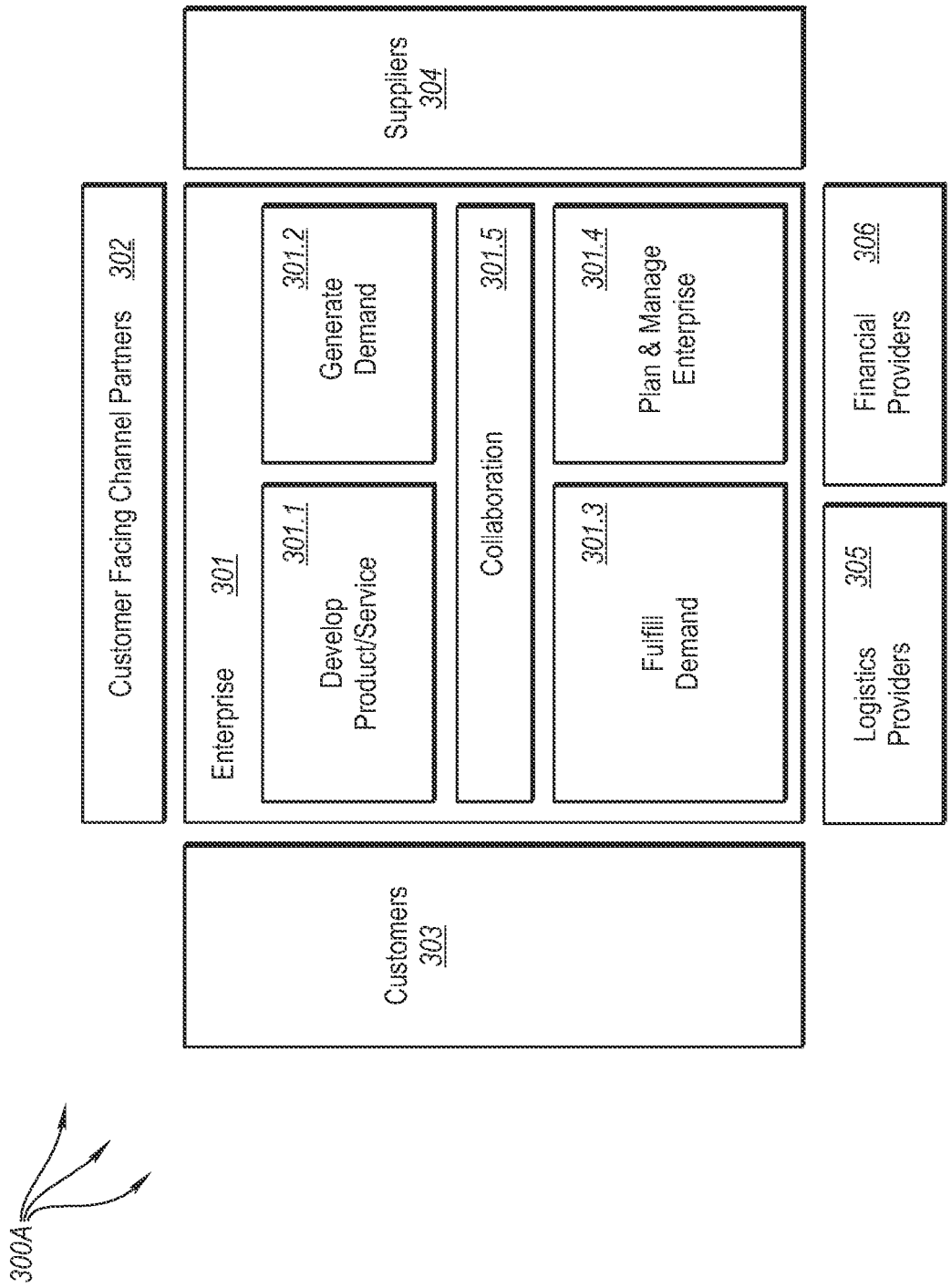
FIGS. 3A and 3B illustrate a visual representation of a collection of business capabilities at varied levels of detail.

Levels of detail can be used to represent (potentially interconnected) sub-capabilities that contribute to the performance other capabilities. FIGS. 3A through 3E depicted collections of business capabilities having various levels of detail and interconnection. Referring now to FIG. 3A, FIG. 3A depicts an example visual representation 300 (e.g., a model) of a collection of business capabilities for an organization. As depicted, the visually rendered business capabilities in visual representation 300 are rendered with varied levels of detail. For example, customer facing channel partners 302, customers 303, suppliers 304, logistic providers 305, and financial providers 306 are rendered with less detail. On the other hand, enterprise 301 is rendered with more detail, depicting other business capabilities that contribute to the performance of enterprise 301. For example, develop product service 301.1, generate demand 301.2, fulfill demand 301.3, plan and manage enterprise 301.4, and collaboration 301.5 are expressly rendered within enterprise 301. Thus, visual representation 3000 represents that develop product service 301.1, generate demand 301.2, fulfill demand 301.3, plan and manage enterprise 301.4, and collaboration 301.5 contribute to the performance of enterprise 301.

Figure 3B:
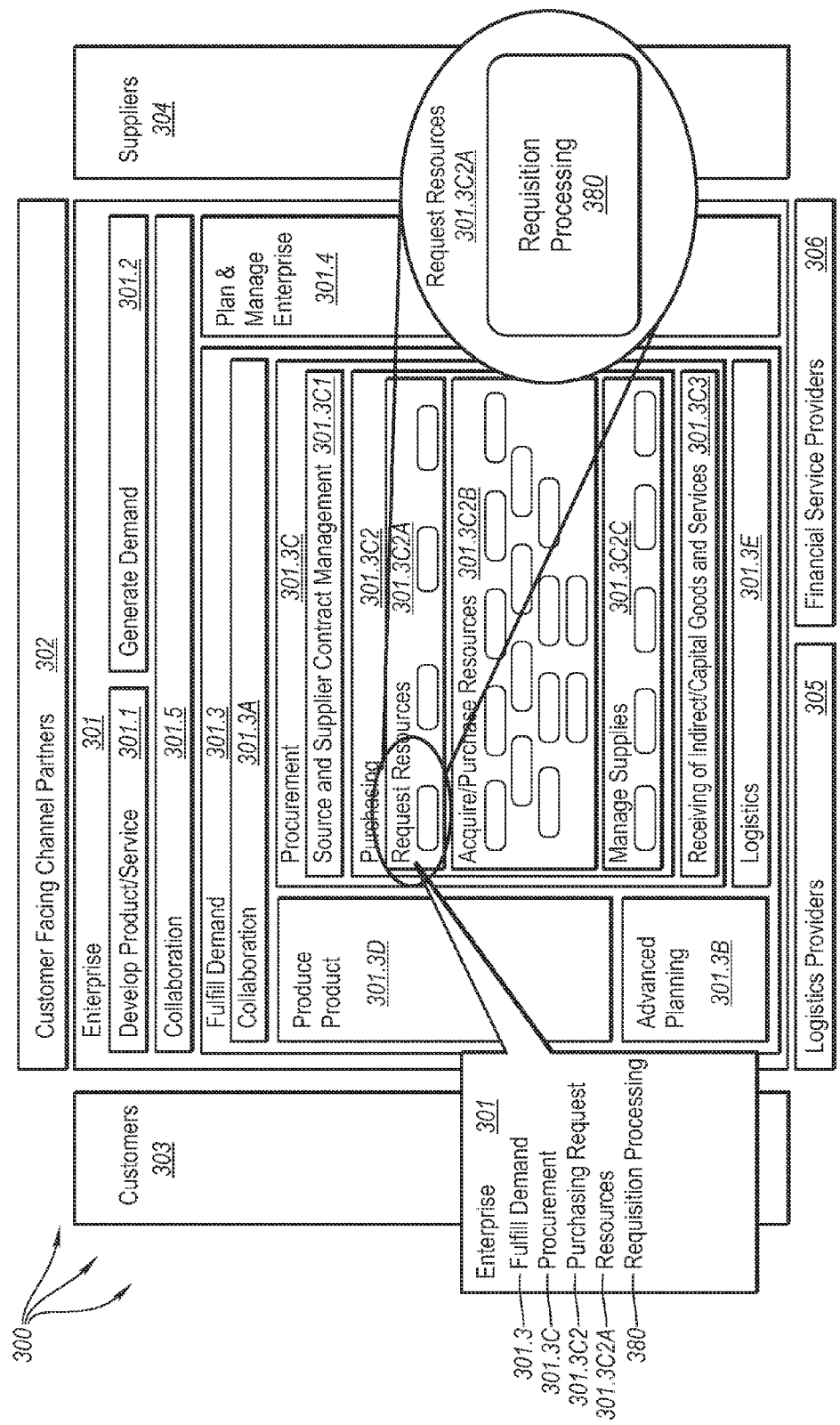

Turning now to FIG. 3B, FIG. 3B depicts visual representation 300 with further levels of detail. FIG. 3B is representative of the way business capabilities can be broken down/decomposed into other capabilities. For example, fulfill demand 301.3 is increased by a number of levels of detail. Fulfill demand 301.3 includes collaboration 301.3A, advanced planning 301.3B, procurement 301.3C, produce product 301.3D, and logistics 301.3E. Thus, collaboration 301.3A, advanced planning 301.3B, procurement 601.3C, produce product 301.3D, and logistics 301.3E contribute to the performance of fulfill demand 301.3 (and as a result also contribute to the performance of enterprise 301).

Procurement 301.3C is further detailed to include source and supplier contract management 301.3C1, purchasing 301.3C2, and receiving of indirect/capital goods and services 301.3C3. Thus, contract management 301.3C1, purchasing 301.3C2, and receiving of indirect/capital goods and services 301.3C3 contribute to the performance of procurement 301.3C (and, as a result, a also contribute to the performance of fulfill demand 301.3 and performance of enterprise 301).

Purchasing 301.3C2 is further detailed to include request resources 301.3C2A, acquire/purchase resources 301.3C2B, and manage supplies 301.3C2C. Thus, request resources 301.3C2A, acquire/purchase resources 301.3C2B, and manage supplies 301.3C2C contribute to the performance of purchasing 301.3C2 (and as a result also contribute to the performance of procurement 301.3C, fulfill demand 301.3, and performance of enterprise 301). Requisition processing 380 is a further sub-capability of request resources request resources 301.3C2A.

Figure 3C:
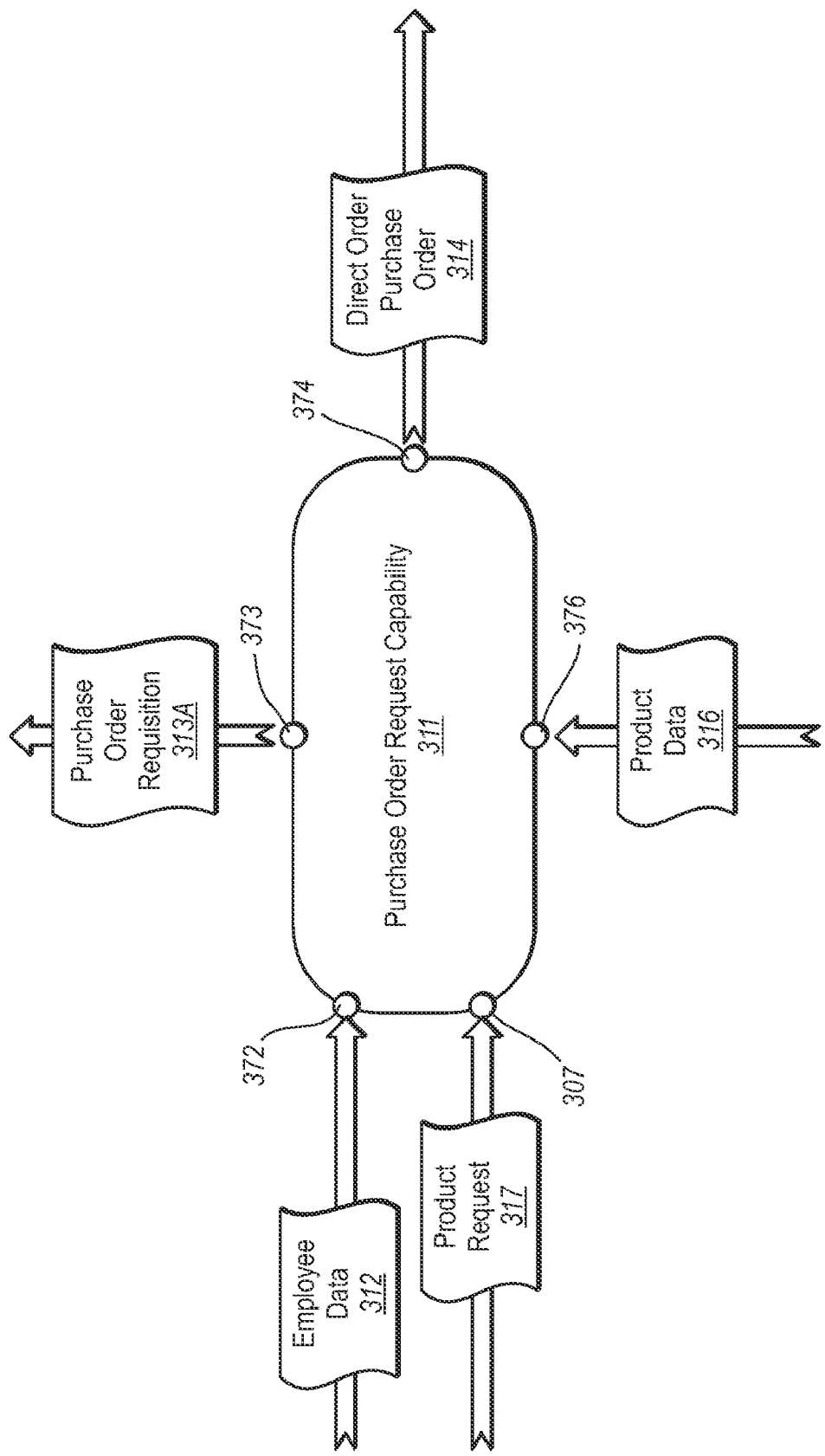
FIG. 3C illustrates an example of a modeled business capability.

Business capability models can also represent data that flows into and data that flows out of the modeled business capabilities. For example, FIG. 3C illustrates an example of a modeled business capability. FIG. 3C, includes purchase order request capability 311 (e.g., modeled based on structured capability data format). Purchase order request capability 311 includes ports 372, 376, and 307 (e.g., modeled based on a structured port data format) that receive employee data 312, product data 316, and product request 317 respectively (e.g., from other business capabilities). Purchase order request capability 311 can use employee data 312, product data 316 and product request 317 to formulate a purchase order request.

Purchase order request capability 311 includes ports 373 and 374 (e.g., modeled based on the structured port data format) that can send purchase order requisition 313A and direct order purchase order 314 respectively (e.g., to other business capabilities). Purchase order request capability 501 can include logic that determines, based on one or more of receive employee data 312, product data 316 and produce request 317, whether purchase order requisition 513A and/or direct order purchase order 314 is to be sent.

Thus, embodiments of the present invention can also utilize models of a network of business capabilities. A first business capability is modeled based upon formatted business capability attributes. A second business capability is modeled based upon the formatted business capability attributes. A connection between the first business capability and the second capability is modeled based upon the formatted business capability attributes.

Figure 3D:
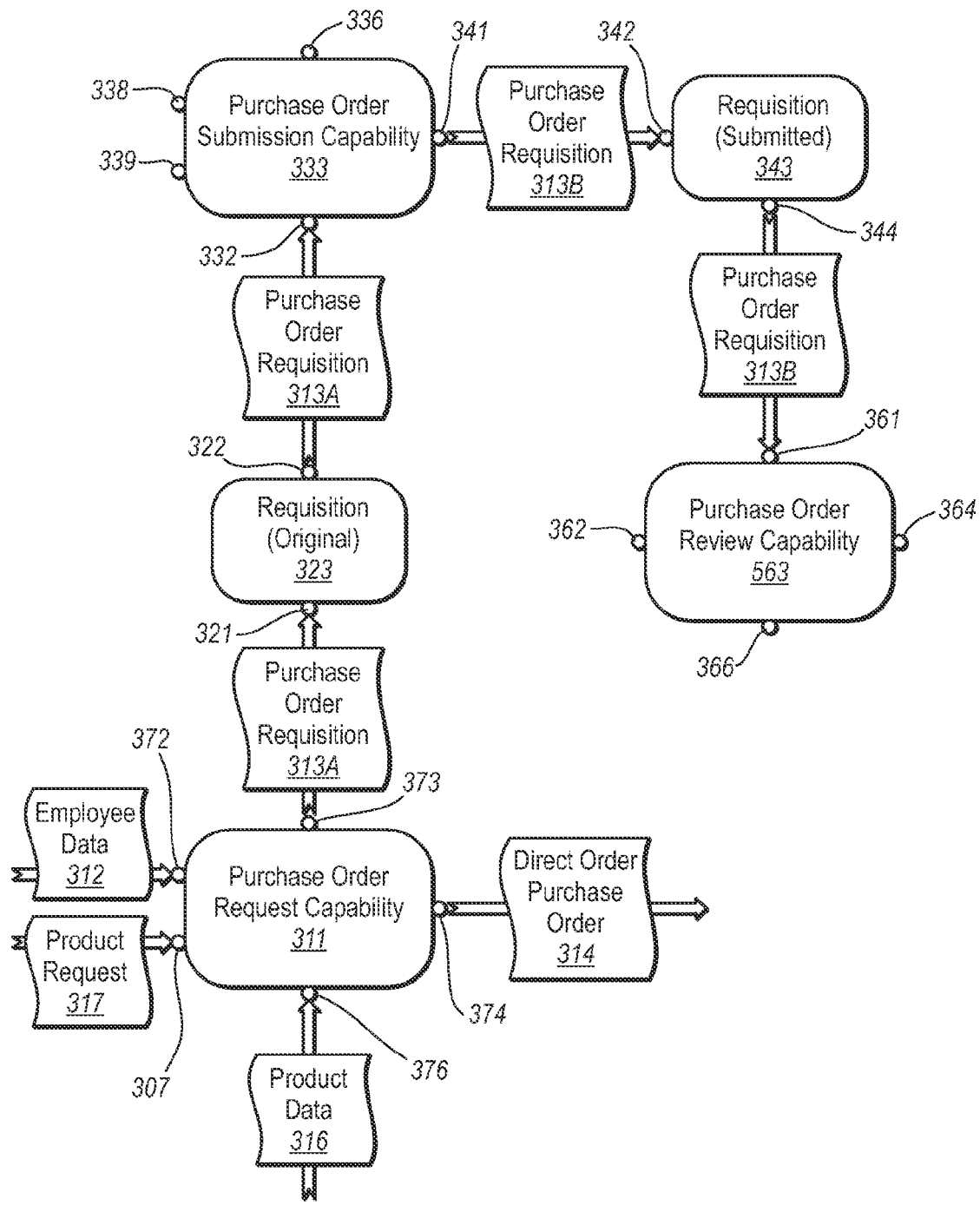
FIG. 3D illustrates a first view of an example of a network of modeled business capabilities.

FIG. 3D illustrates a first view of an example of a network of modeled business capabilities including purchase order request capability 311. As depicted, purchase order request capability 311 (a capability) sends purchase order request 313A out of port 373 to requisition 323 (a connector).

Requisition 323 receives purchase order requisition 313A at port 312. Requisition 323 sends purchase order requisition 313A out of port 322 to purchase order submission capability 333. Thus, requisition 323 transfers purchase order requisition 313A from purchase order request capability 311 to purchase order submission capability 333. Accordingly, a connector can be viewed as a business capability wherein the capability of the connector is to transfer data between other capabilities.

Purchase order submission capability 333 receives purchase order requisition 313A at port 332. Purchase order submission capability 333 includes other ports, including ports 336, 338, 339, and 341. Each of the ports 336, 338, 339, and 341 can be used to send data to and/or receive data from other capabilities or connectors. More specifically, purchase order submission capability 332 sends purchase order 313B out of port 341 to requisition 343 (a connector). Although similar to purchase order requisition 313A, purchase order requisition 313B can differ from purchase order 313A as a result of processing at purchase order submission capability 332.

Requisition 343 receives purchase order requisition 313B at port 342. Requisition 343 sends purchase order requisition 313B out of port 344 to purchase order review capability 363. Purchase order review capability 563 receives purchase order requisition 313B at port 361. Purchase order review capability 363 includes other ports, including ports 362, 364, and 366. Each of the ports 362, 364, and 366 can be used to send data to and/or receive data from other capabilities or connectors.

Although one-way ports and connectors have been depicted in FIG. 3D, it should be understood that embodiments of the present invention can include two-way ports and/or two-way connectors. For example, it may be that, from time to time, requisition 323 also transfers data from purchase order submission capability 333 (coming out of port 332 and into port 322) to purchase order request capability 311 (coming out of port 321 and into port 373). Similarly, it may be that, from time to time, requisition 343 also transfers data from purchase order review capability 363 (coming out of port 361 and into port 344) to purchase order submission capability 333 (coming out of port 342 and into port 341).

Figure 3E:
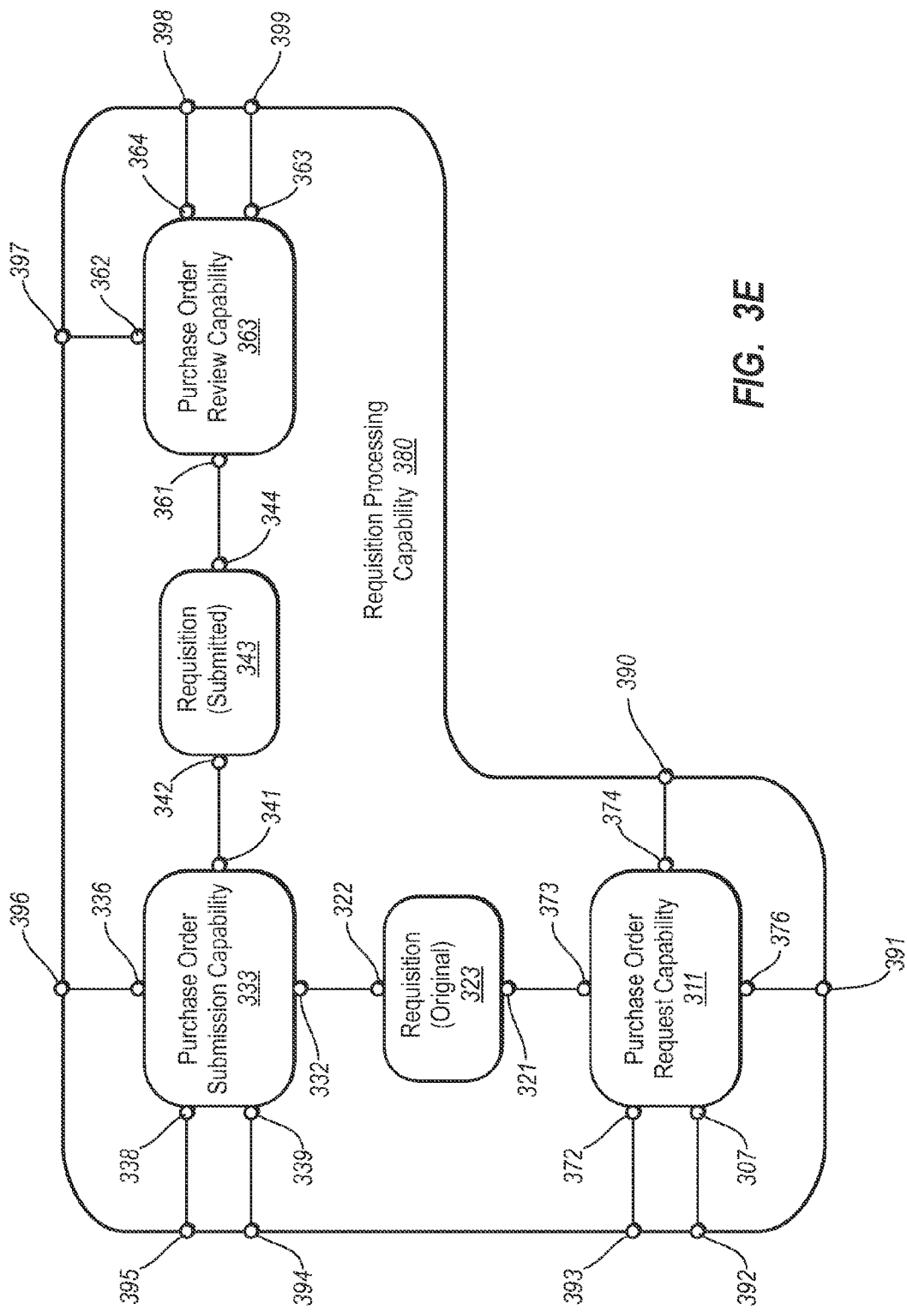
FIG. 3E illustrates a second view of the example of a network of modeled business capabilities.

A network of business capabilities can also be represented in a manner that abstracts the data exchanged between various business capabilities and connectors in the business capability network. Further, in some embodiments and as previously described, a network of more granular business capabilities (or those at higher levels of detail) can be used to model a more coarse business capability (or those at lower levels of detail). FIG. 3E illustrates a second view of the example of a network of modeled business capabilities in FIG. 3D representing requisition processing capability 380 (from FIG. 3B).

The network of business capabilities in FIG. 3E abstracts out the data that is exchanged between the business capabilities and connections in FIG. 3D. FIG. 3E further depicts that the more granular business capabilities and connections in FIG. 3D can be used to model a more coarse requisition processing capability 380. Ports 390-399 represent that requisition processing capability 380 can exchange data with other business capabilities and connectors, for example, included in request resources 301.3C2A (of FIG. 3B) or in part of some other general procurement network of business capabilities.

Although particular models have been described with respect to FIGS. 3A-3E, embodiments of the invention are not so limited. Embodiments of the invention can be practiced with virtually any type of model that represents business capabilities and/or business processes.

It should be understood that schemas for one or more business layers that contribute to business capabilities can include data definitions indicating how the business layers and their entities contribute to business capabilities. Thus, a business capability schema can include data definitions representing links to business layers and/or entities. For example, an entity/layer link schema definitions for contributions from people, process, and technology layers of a business capability.

Figure 4:
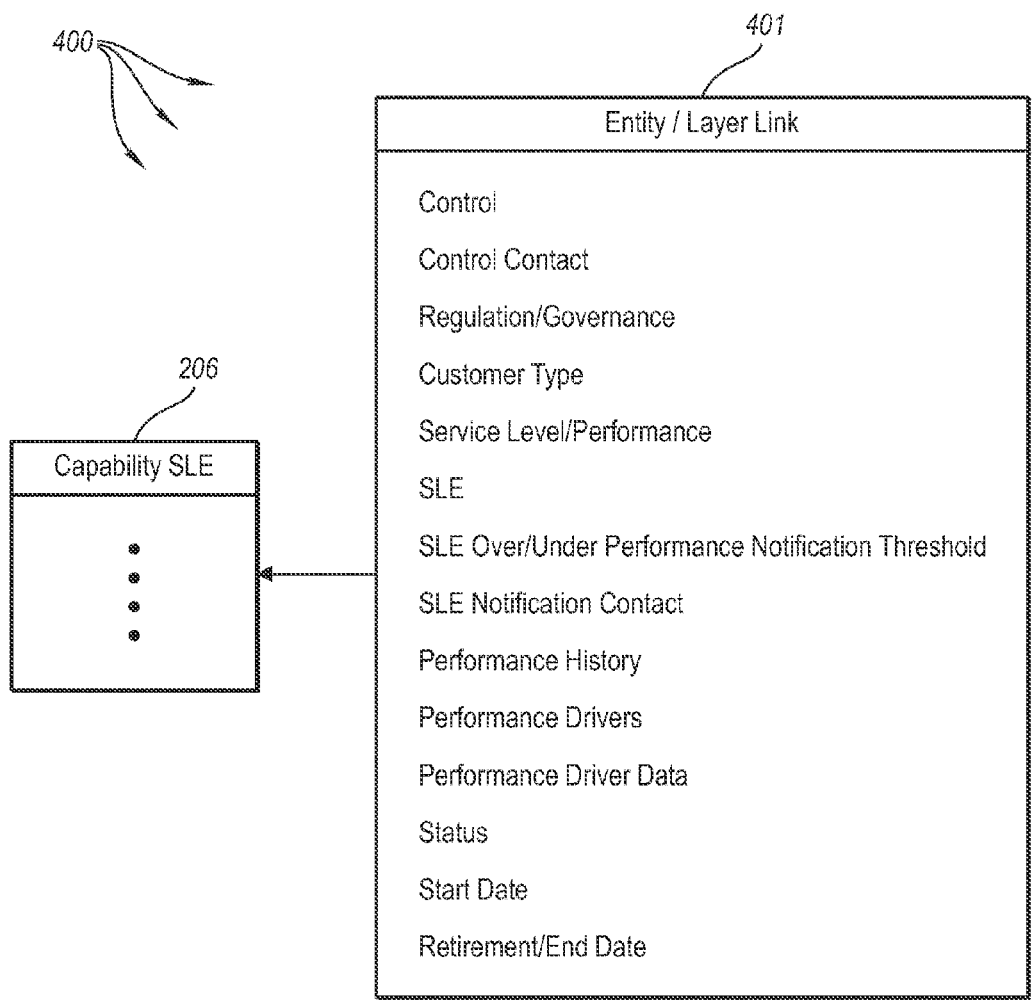
FIG. 4 illustrates a capability SLE schema relative to an entity/layer link schema.

FIG. 4 illustrates capability SLE schema 306 relative to an entity/layer link schema 400. Entity/layer link schema 400 includes properties 401 that define a data format for entity/layer links. Depicted in FIG. 2, schema 200 includes connector data format 223. Generally, an entity/layer link data format can be described as indicated in Table 12.

TABLE 12

| Name | Data Type | Description |
| --- | --- | --- |
| Control | Logical | (Yes/No) Does the capability owner control this. For example, if it's a airport check in Kiosk, then the airline doesn't control who does it.if it's outsourced, the owner of the capability probably doesn't control the specifics of the process. |
| Control Contact | varchar(100) | Name, phone number, and E-mail address of the owner, if it is Yes in the Control value |
| Regulation/ Governance | Logical | (Yes/No) Required through corporate policy (governance) or regulation. |
| CustomerType | int | For a given customer this can be used to set different service level expectations for different levels, e.g., first class and coach in the airlines. This can be a user definable set of values to compensate for differences across organizations. For example, first class on a flight may be a Premier Executive relationship to that same airline in terms of frequent flier status. |
| Service Level/ Performance. | int | Time, cost, quality, quantity metric per instance or unit of measure. |
| SLE | int | Current expected performance. |
| SLE Over/ Under Performance Notification Threshold | int | How much variation in performance (e.g., from a goal) is tolerated before a variation is noted or notification is sent. For example, when a variance threshold is exceeded an electronic mail message can be sent to appropriate management personnel |
| SLE Notification Contact | varchar(100) | Name, phone number, and E-mail address of contact. |
| Performance History | int | Frequency of use, range of performance, variations in SLE, etc. |
| Performance Drivers | int | Of the performance measure elements, Quality, Cost, Quantity, Time, (None may be an option here) etc. metric, which of them has the greatest impact on performance |
| Performance Driver Data | int | Cost, Risk, Benefit, Impact, Agility, information for changing a Performance Driver |
| Staus | int | Active, planned to go active, retired, dormant/on hold, etc. |
| Start Date | date | The date this people, process, technology was added |
| Retirement/ End Data | date | The date this people, process, technology was retired, if applicable |

Figure 5:
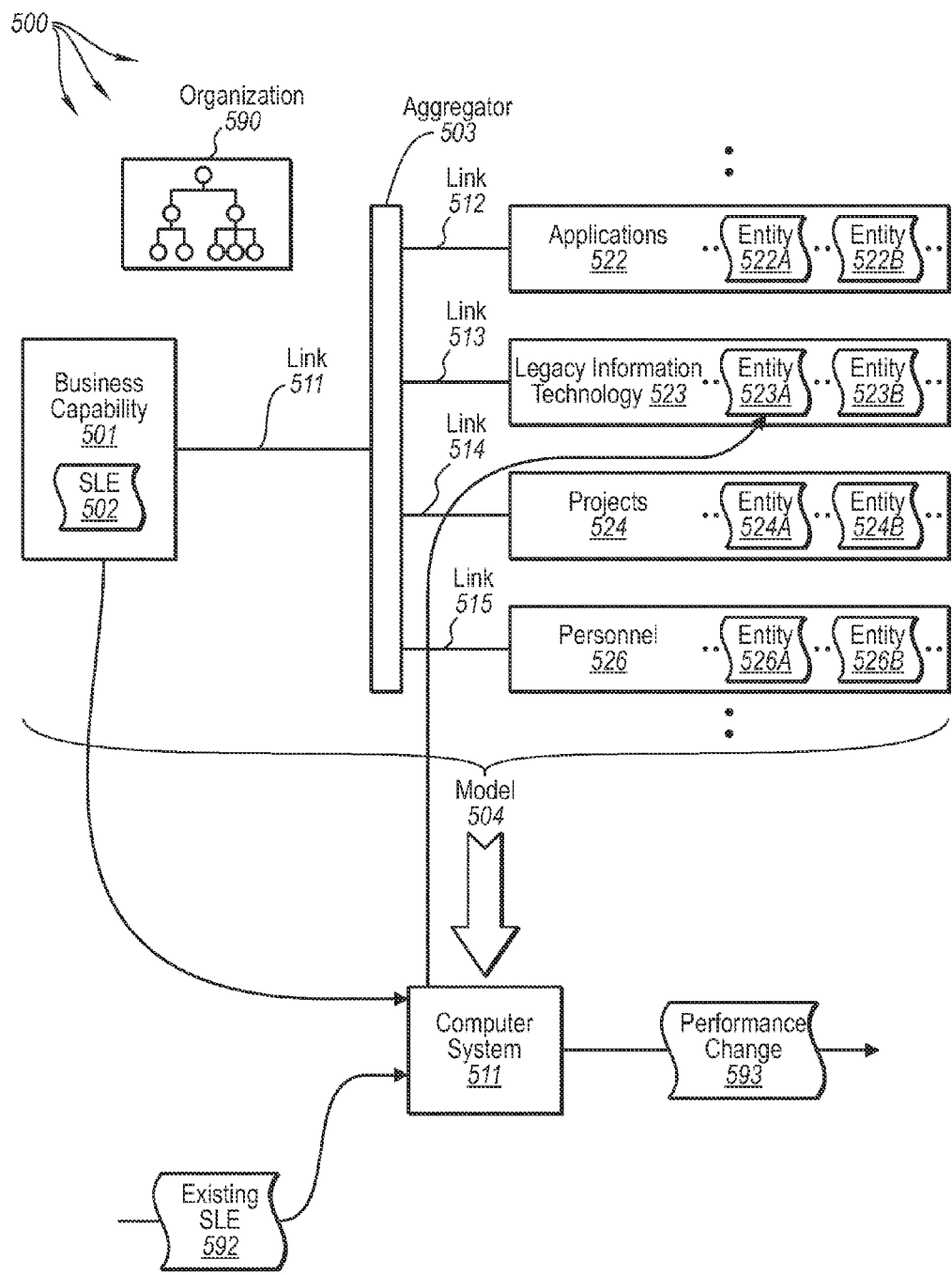
FIG. 5 illustrates an example computer architecture that links a service level expectation to performing entities.

FIG. 5 illustrates an example computer architecture 500 that links a service level expectation to performing entities. As depicted, computer architecture 500 includes computer system 511 and model 504. Model 504 represents a model of the business capabilities of organization 590. Generally, computer system 511 is configured to access model 504 and determines if changes to business entities and/or business layers impact an SLE for business capability 501. Applications 522, legacy information technology 523, projects 524, and personnel 526 can each include one or more entities distributed across technology layer 111, process layer 112, and people layer 113.

For example, applications 522 include entities 522A and 522B, which can be for example, a deployed application and a software developer. Legacy information technology 532 includes entities 523A and 523B, which can be for example, a mainframe computer system and a maintenance contractor. Projects 524 includes entity 524A and entity 524B, which can be for example, a workflow and a workflow management team. Personnel 526 includes entities 526A and 526B, which can be a customer service representative and a customer.

Applications 522, legacy information technology 523, projects 524, and personnel 526 as well as included entities can be modeled in accordance with schema 400. Business capability 501 can be modeled in accordance with schema 200. Thus, links 511, 512, 513, 514, and 515 can be evaluated to determine impacts on SLE 502.

Aggregator 503 is configured to receive one or more links from entities and/or layers and aggregate the links into a link indicating a contribution to SLE 502. Thus, aggregator 503 can include one or more components to transform, normalize, regulate, etc., received links relative to one another to properly evaluate the contribution of each received link to SLE 502.

Figure 7:
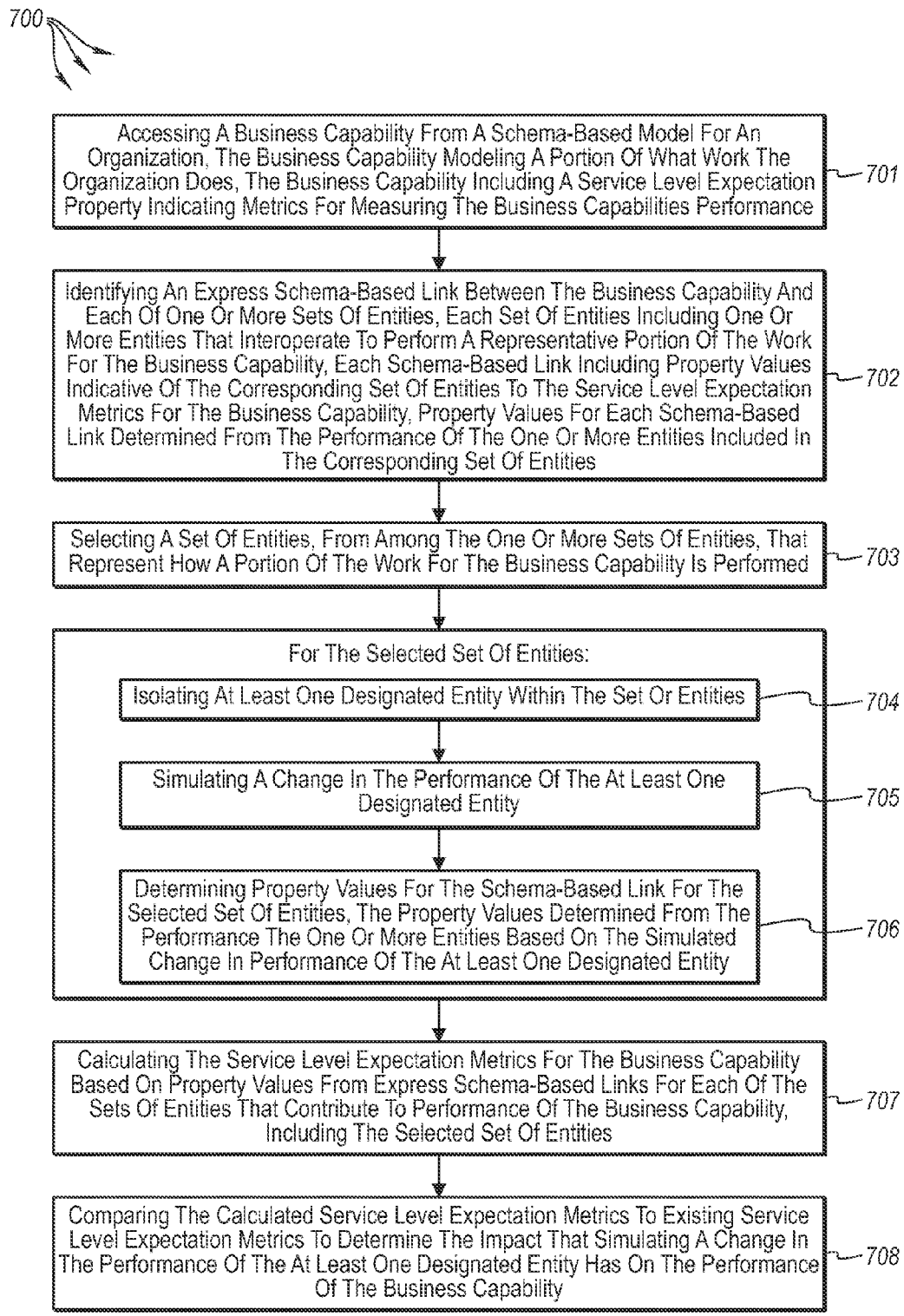
FIG. 7 illustrates an example flowchart of a method for linking a service level expectation to performing entities.

FIG. 7 illustrates an example flowchart of a method 700 for linking a service level expectation to performing entities. The method 700 will be described with respect to the components and data in computer architecture 500.

Method 700 includes an act of accessing a business capability from the schema-based model for the organization, the business capability modeling a portion of what work the organization does, the business capability including a service level expectation property indicating metrics for measuring the business capabilities performance (act 701). For example, computer system 511 can access model 504 and from model 504 can access business capability 501. Business capability 501 can model a portion of what an organization does. Business capability 501 includes SLE 502 for measuring the performance of business capability 501.

Method 700 includes an act of identifying an express schema-based link between the business capability and each of one or more sets of entities, each set of entities including one or more entities that interoperate to perform a representative portion of the work for the business capability, each schema based-link including property values indicative of the contribution of the corresponding set of entities to the service level expectation metrics for the business capability, property values for each schema-based link determined from the performance of the one or more entities included in the corresponding set of entities (act 702). For example, computer system 511 can identify links 512, 513, 514, and 515 to applications 522, legacy information technology 523, projects 524, and personal 526 respectively. Each of applications 522, legacy information technology 523, projects 524, and personal 526 can include a blend of entities from different business layers that interoperate to perform a portion of what business capability 501 does.

Each of links 512, 513, 514, and 515 can include property values, defined in accordance with schema 400, indicative of the contribution of their corresponding set of entities to SLE 502. For example, link 512 can include properties indicative of the contribution of entity 522A, entity 522B, etc., to SLE 502. The property values can be determined from the performance of the one or more entities in the set. For example, the property values of link 512 can be determined from the performance of entity 522A, entity 522B, etc.

Method 700 includes an act of selecting a set of entities, from among the one or more sets of entities, that represent how a portion of the work for the business capability is performed (act 703). For example, computer system 511 can select legacy information technology 523. Method 700 includes an act of isolating at least one designated entity within the set of entities (act 704). For example, computer system 511 can isolate entity 523A. However, multiple entities can also be isolated, such as, for example, entity 523A and entity 523B together.

Method 700 includes an act of simulating a change in the performance of the at least one designated entity (act 705). For example, computer system 511 can simulate a change (increase or decrease) in the performance of entity 523A. However, changes to multiple entities can be simulated, such as, for example, simulated a change to entity 523A and entity 523B together.

Method 700 includes an act of determining property values for the schema-based link for the selected set of entities, the property values determined from the performance of the one or more entities based on the simulated change in performance of the at least one designated entity (act 706). For example, computer system 511 can determine property values for link 513 based on the simulated change in performance of entity 523A.

Method 700 includes an act of calculating the service level expectation metrics for the business capability based on property values from express schema-based links for each of the sets of entities that contribute to performance of the business capability, including the selected set of entities (act 707). For example, computer system 511 can calculate metrics for SLE 502 from links 512, 513, 514 and 515. Aggregator 503 can then aggregate links 512, 513 (representing an impact of the simulated change to entity 523A), 514 and 515 into link 511. Link 511 can then be used to populate metrics for SLE 502.

Method 700 includes an act of comparing the calculated service level expectation metrics to existing service level expectation metrics to determine the impact that simulating a change in the performance of the at least one designated entity has on the performance of the business capability (act 708). For example, computer system 511 can compare SLE 502 (metrics representing impact of simulated change to entity 523A) to existing SLE 592 (e.g., prior baseline metric values) to determine performance change 593. From the comparison computer system 511 can determine the impact of the simulated change to entity 523A on business capability. If large simulated change in entity 523A had limited impact on SLE 502 in can be determined that in entity 523A is relatively insignificant to business capability 501. Thus, further investment to improve entity 523A may not be worthwhile. On the other hand, if a small simulated change in entity 523A had a significant impact on SLE 502 in can be determined that in entity 523A is relatively significant to business capability 501. Thus, further investment to improve entity 523A may be worthwhile.

Figure 6:
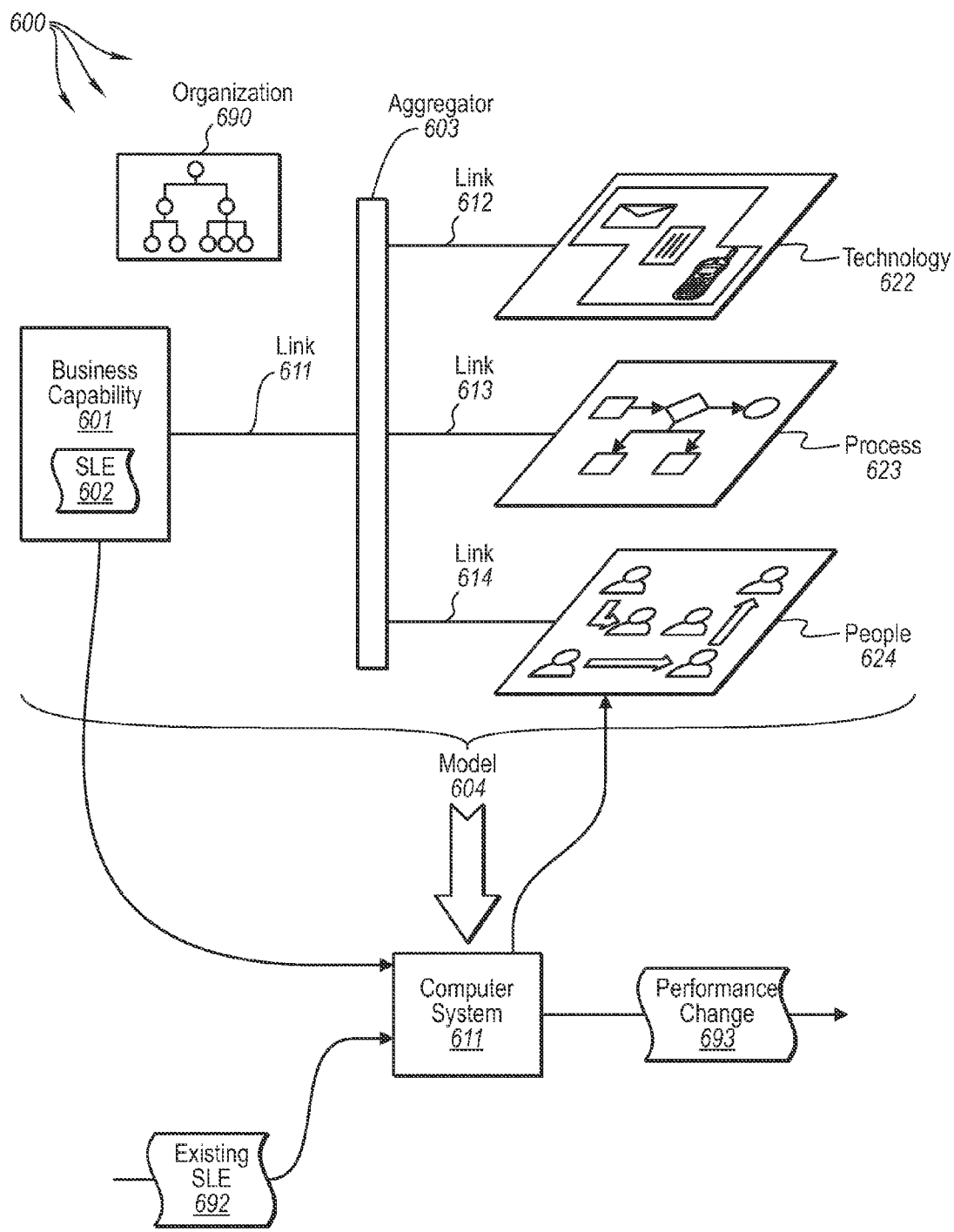
FIG. 6 illustrates an example computer architecture that links a service level expectation to performing business layers.

FIG. 6 illustrates an example computer architecture 600 that links service level expectation 602 to performing business layers. As depicted, computer architecture 600 includes computer system 611 and model 604. Model 604 represents a model of the business capabilities of organization 690. Generally, computer system 611 is configured to access model 604 and determines if changes to business layers technology 622, process 623, and people 624 impact an SLE for business capability 601. Each of the layers can include one or more entities that contribute to SLE 602.

Technology 622, process 623, and people 624 as well as included entities can be modeled in accordance with schema 400. Business capability 601 can be modeled in accordance with schema 200. Thus, links 611, 612, 613, and 614 can be evaluated to determine impacts on SLE 602.

Aggregator 603 is configured to receive one or more links from entities and/or layers and aggregate the links into a link indicating a contribution to SLE 602. Thus, aggregator 603 can include one or more components to transform, normalize, regulate, etc., received links relative to one another to properly evaluate the contribution of each received link to SLE 602.

Simulated changes to the performance of particular entities within a layer can be made to determine the impact to the layer and to SLE 602. Computer system 611 can compare SLE 602 (metrics representing a simulated change) to existing SLE 692 (e.g., prior baseline metric values) to determine how changes to a particular layer impact SLE 602. Computer system 611 can compare SLE 602 to existing SLE 592 (e.g., prior baseline metric values) to determine performance change 693.

In some embodiments, different combinations of layers are turned off to determine the impact of remaining layers on SLE metrics. For example, SLE 602 can be calculated solely from link 612 to determine the contribution of technology 622 on SLE 602.

Accordingly, embodiments of the invention facilitate an express, measured relationship between each entity and the performance of a corresponding business capability. Thus, when an entity or layer changes, the impact to the performance can be asserted, and later validated through the specific measures.

Further, since there can be multiple instances of the same capability and capabilities can be decomposed in sub-capabilities it is possible to weight different portions of contribution to an SLE. For example, referring once more to the airline check in example, a business capability can define "what" work is done as "Preparing To Fly". Sub-capabilities to "Preparing To Fly" can include authenticate passengers, issue permission to board (boarding pass), and "check luggage".

So the SLE, of that set of sub-capabilities can be weighted such that completing the work in a timeframe that doesn't delay the flight contributes to 55% of the SLE, customer satisfaction contributes 25% of the SLE, and employee satisfaction contributes 20% to the SLE. Thus, the addition of the kiosks and online check in improve overall throughput, and by giving the customer control, their satisfaction goes up, and by taking pressure off the employees, their satisfaction should improve. Accordingly, then keeping track of each implementation of the capability, when any one of those three components to the SLE gets out of line with expectations (flight delays, customer dissatisfaction, and employee dissatisfaction), includes determining which can be changed.

For example, airlines can't change the regulation for passenger authentication and in the US the standard "did you pack your own bags" FAA questions). Further, airlines can't control the experience or knowledge of the online user or the kiosk user. Within those constraints, depending on which part of the three components is out of line with expectations, that would inform the airline whether they change the number of kiosks, provide incentives in increase online check ins, or change the experience at the counter.

Beyond that, when a basic requirement changes, the change can have varied levels of impact on the different implementations of a capability. For example, introducing a separate fee for checked luggage may make kiosk check in significantly more inefficient. On the other hand, counter check in may be only minimally impacted since gate agents are often already receiving forms of payment for other items. Online check in may be impacted even less when passengers know how many bags they will have before flying.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. In a computer architecture, the computer architecture comprising one or more computer processors and data storage, the computer architecture configured to access a schema-based model for an organization, the schema-based model modeling a plurality of interrelated business capabilities for the organization, each business capability representing a portion of what work the organization does, each business capability associated with a corresponding service level expectation indicating metrics for measuring the performance of the business capability, each business capability associated with a one or more entities that represent how the business capability does its corresponding portion of work, a method for determining what impact a change in an entity's performance has on a business capability's performance, the method comprising:

- an act of accessing from data storage a business capability from the schema-based model for the organization, the business capability modeling a portion of what work the organization does, the business capability including a service level expectation property indicating metrics for measuring the business capabilities performance;
- an act of identifying an express schema-based link between the business capability and each of one or more sets of entities, each set of entities including one or more entities that interoperate to perform a representative portion of the work for the business capability, each schema based-link including property values indicative of the contribution of the corresponding set of entities to the service level expectation metrics for the business capability, property values for each schema-based link determined from the performance of the one or more entities included in the corresponding set of entities;
- an act of selecting a set of entities, from among the one or more sets of entities, that represent how a portion of the work for the business capability is performed;
- for the selected set of entities:
    - an act of isolating at least one designated entity within the set or entities;
    - an act of simulating a change in the performance of the at least one designated entity; and
    - the one or more processors determining property values for the schema-based link for the selected set of entities, the property values determined from the performance the one or more entities based on the simulated change in performance of the at least one designated entity;
- the one or more processors calculating the service level expectation metrics for the business capability based on property values from express schema-based links for each of the sets of entities that contribute to performance of the business capability, including the selected set of entities; and
- an act of comparing the calculated service level expectation metrics to existing service level expectation metrics to determine the impact that the simulated change in the performance of the at least one designated entity has on the performance of the business capability.

2. The method as recited in claim 1, wherein the act of accessing a business capability from the schema-based model for the organization comprises an act of accessing a business capability that has a schematized service level expectation.

3. The method as recited in claim 1, wherein the act of identifying an express schema-based link between the business capability and each of one or more sets of entities comprises an act of identifying express schema-based links to sets of entities that have entities distributed across different business layers for the organization.

4. The method as recited in claim 1, wherein the act of selecting a set of entities comprises an act of selecting a specified business layer.

5. The method as recited in claim 1, wherein the act of isolating at least one designated entity within the set or entities comprises an act of isolating a plurality of entities.

6. The method as recited in claim 1, wherein the act of simulating a change in the performance of the at least one designated entity comprises an act of simulating a change to a plurality of entities.

7. The method as recited in claim 1, wherein the act of simulating a change in the performance of the at least one designated entity comprises an act of turning off an entire business layer.

8. The method as recited in claim 1, wherein calculating the service level expectation metrics for the business capability based on property values from express schema-based links comprises an act of aggregating contributions from a plurality of schema-based links into a single schema-based link for use in calculating the service level expectation metrics.

9. The method as recited in claim 1, wherein the act of comparing the calculated service level expectation metrics to existing service level expectation metrics to determine the impact that the simulated change in the performance of the at least one designated entity has on the performance of the business capability comprises determining that the at least one designated entity has a relative significant impact on the service level expectation metrics such that further investment in improving the entity is warranted.

10. The method as recited in claim 1, wherein the act of comparing the calculated service level expectation metrics to existing service level expectation metrics to determine the impact that the simulated change in the performance of the at least one designated entity has on the performance of the business capability comprises determining that change to an entity at one of a technology layer, a process layer, and a people can increase the performance of the business capability.

11. A computer program product for use in a computer architecture, the computer architecture configured to access a schema-based model for an organization, the schema-based model modeling a plurality of interrelated business capabilities for the organization, each business capability representing a portion of what work the organization does, each business capability associated with a corresponding service level expectation indicating metrics for measuring the performance of the business capability, each business capability associated with a one or more entities that represent how the business capability does its corresponding portion of work, the computer program product for implementing a method for determining what impact a change in an entity's performance has on a business capability's performance, the computer program product comprising one or more computer storage media having stored thereon computer executable instructions that, when executed at processor, cause the computer system to perform the method including the following:

- access a business capability from the schema-based model for the organization, the business capability modeling a portion of what work the organization does, the business capability including a service level expectation property indicating metrics for measuring the business capabilities performance;
- identify an express schema-based link between the business capability and each of one or more sets of entities, each set of entities including one or more entities that interoperate to perform a representative portion of the work for the business capability, each schema based-link including property values indicative of the contribution of the corresponding set of entities to the service level expectation metrics for the business capability, property values for each schema-based link determined from the performance of the one or more entities included in the corresponding set of entities;
- select a set of entities, from among the one or more sets of entities, that represent how a portion of the work for the business capability is performed;

for the selected set of entities:
  isolate at least one designated entity within the set or entities;
  simulate a change in the performance of the at least one designated entity; and
  determine property values for the schema-based link for the selected set of entities, the property values determined from the performance the one or more entities based on the simulated change in performance of the at least one designated entity;
calculate the service level expectation metrics for the business capability based on property values from express schema-based links for each of the sets of entities that contribute to performance of the business capability, including the selected set of entities; and
compare the calculated service level expectation metrics to existing service level expectation metrics to determine the impact that the simulated change in the performance of the at least one designated entity has on the performance of the business capability.

12. The computer program product recited in claim 11, wherein computer executable instructions that, when executed, cause the computer system to access a business capability from the schema-based model for the organization comprise computer executable instructions that, when executed, cause the computer system to access a business capability that has a schematized service level expectation.

13. The computer program product recited in claim 11, wherein computer executable instructions that, when executed, cause the computer system to identify an express schema-based link between the business capability and each of one or more sets of entities comprise computer executable instructions that, when executed, cause the computer system to identify express schema-based links to sets of entities that have entities distributed across different business layers for the organization.

14. The computer program product recited in claim 11, wherein computer executable instructions that, when executed, cause the computer system to selects a set of entities comprise computer executable instructions that, when executed, cause the computer system to select a specified business layer.

15. The computer program product recited in claim 11, wherein computer executable instructions that, when executed, cause the computer system to isolating at least one designated entity within the set or entities comprise computer executable instructions that, when executed, cause the computer system to isolating a plurality of entities.

16. The computer program product recited in claim 11, wherein computer executable instructions that, when executed, cause the computer system to simulate a change in the performance of the at least one designated entity comprise computer executable instructions that, when executed, cause the computer system to simulate a change to a plurality of entities.

17. The computer program product recited in claim 11, wherein computer executable instructions that, when executed, cause the computer system to simulate a change in the performance of the at least one designated entity comprise computer executable instructions that, when executed, cause the computer system to turning off an entire business layer.

18. The computer program product recited in claim 11, wherein computer executable instructions that, when executed, cause the computer system to calculate the service level expectation metrics for the business capability based on property values from express schema-based links comprise computer executable instructions that, when executed, cause the computer system to aggregate contributions from a plurality of schema-based links into a single schema-based link for use in calculating the service level expectation metrics.

19. In a computer architecture, the computer architecture comprising one or more computer processors and data storage, the computer architecture configured to access a schema-based model for an organization, the schema-based model modeling a plurality of interrelated business capabilities for the organization, each business capability representing a portion of what work the organization does, each business capability associated with a corresponding service level expectation indicating metrics for measuring the performance of the business capability, each business capability associated with a one or more entities in one or more distinct business layers that represent how the business capability does its corresponding portion of work, a method for determining what impact a change in an entity's performance has on a business capability's performance, the method comprising:
  an act of accessing from data storage a business capability from the schema-based model for the organization, the business capability modeling a portion of what work the organization does, the business capability including a service level expectation property indicating metrics for measuring the business capabilities performance;
  an act of identifying an express schema-based link between the business capability and entities at each of the one or more distinct business layers, each business layer including one or more entities that interoperate to perform a representative portion of the work for the business capability, each schema based-link including property values indicative of the contribution of the a corresponding distinct business layer to the service level expectation metrics for the business capability, property values for each schema-based link determined from the performance of the entities included the distinct business layer;
  an act of selecting a business layer from among the distinct business layers;
  for the selected business layer:
    an act of isolating at least one designated entity within the business layer;
    an act of simulating a change in the performance of the at least one designated entity; and
    the one or more processors determining property values for the schema-based link for the business layer, the property values determined from the performance the one or more entities based on the simulated change in performance of the selected business layer;
  the one or more processors calculating the service level expectation metrics for the business capability based on property values from express schema-based links for each of the designated business layers; and
  an act of comparing the calculated service level expectation metrics to existing service level expectation metrics to determine the impact that the simulated change in the performance of the selected business layer has on the performance of the business capability.

20. The method as recited in claim 19, wherein the distinct business layers are a technology layer, a process layer, and a people layer.

* * * * *